(12) United States Patent
Roehrig et al.

(10) Patent No.: US 10,875,602 B2
(45) Date of Patent: Dec. 29, 2020

(54) TRANSMISSION SHIFTING ASSISTANCE DEVICE AND SHIFTING DEVICE FOR A MOTORCYCLE

(71) Applicant: Bayerische Motoren Werke Aktiengesellschaft, Munich (DE)

(72) Inventors: Berndt Roehrig, Eichenau (DE); Norbert Pitzer, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 663 days.

(21) Appl. No.: 15/713,751

(22) Filed: Sep. 25, 2017

(65) Prior Publication Data
US 2018/0009507 A1 Jan. 11, 2018

Related U.S. Application Data

(63) Continuation of application No. PCT/EP2016/054966, filed on Mar. 9, 2016.

(30) Foreign Application Priority Data

Apr. 29, 2015 (DE) .......................... 10 2015 207 906

(51) Int. Cl.
*B62M 25/06* (2006.01)
*F16H 63/50* (2006.01)
(Continued)

(52) U.S. Cl.
CPC ............ *B62M 25/06* (2013.01); *F16H 63/34* (2013.01); *F16H 63/502* (2013.01);
(Continued)

(58) Field of Classification Search
CPC ...... B62M 25/06; F16H 63/34; F16H 63/502; F16H 2059/0234; F16H 2061/223; F16H 2063/3089
(Continued)

(56) References Cited

U.S. PATENT DOCUMENTS 3,122,936 A 3/1964 Dykes
5,600,953 A 2/1997 Oshita et al.
(Continued)

FOREIGN PATENT DOCUMENTS

CN 2842101 Y 11/2006
CN 202812166 U 3/2013
(Continued)

OTHER PUBLICATIONS

Chinese-language Office Action issued in Chinese Application No. 201680004400.7 dated Mar. 11, 2020 with English translation (10 pages).
(Continued)

*Primary Examiner* — William C Joyce
(74) *Attorney, Agent, or Firm* — Crowell & Moring LLP

(57) ABSTRACT

A transmission shifting assistance device, in particular for a motorcycle, which allows shifting when the clutch is closed, includes a housing, a piston arranged in the housing, and at least one pressure spring provided in the housing. The piston may be moved relative to the housing by compressing at least one pressure spring. Furthermore, transmission shifting assistance device further includes a locking device separate from the at least one pressure spring. The locking device fixes the piston in a neutral position relative to the housing below a predetermined unlocking force exerted on the piston or the housing.

12 Claims, 1 Drawing Sheet

(51) Int. Cl.
  F16H 63/34 (2006.01)
  *F16H 59/02* (2006.01)
  *F16H 61/22* (2006.01)
  *F16H 63/30* (2006.01)

(52) U.S. Cl.
  CPC ............... *F16H 2059/0234* (2013.01); *F16H 2061/223* (2013.01); *F16H 2063/3089* (2013.01)

(58) Field of Classification Search
  USPC .................................................. 74/473.169
  See application file for complete search history.

(56) References Cited

U.S. PATENT DOCUMENTS

| | | | |
|---|---|---|---|
| 5,692,992 | A | 12/1997 | Arvidsson et al. |
| 9,518,649 | B2 * | 12/2016 | Tanaka ............... F16H 59/02 |
| 2003/0094057 | A1 | 5/2003 | Bigi |
| 2014/0123799 | A1 | 5/2014 | Landino et al. |

FOREIGN PATENT DOCUMENTS

| | | |
|---|---|---|
| CN | 103807430 A | 5/2014 |
| DE | 601 00 951 T2 | 7/2004 |
| DE | 10 2010 015 037 A1 | 10/2011 |
| DE | 10 2011 086 243 A1 | 5/2013 |
| DE | 10 2012 111 908 A1 | 6/2014 |
| DE | 10 2014 103 789 A1 | 9/2015 |
| EP | 1 975 472 A1 | 10/2008 |
| EP | 2 068 044 A2 | 6/2009 |
| WO | WO 2007/064221 A1 | 6/2007 |

OTHER PUBLICATIONS

Chinese-language Office Action issued in counterpart Chinese Application No. 201680004400.7 dated Jul. 19, 2019 with English translation (12 pages).

Chinese-language Office Action issued in counterpart Chinese Application No. 201680004400.7 dated Jun. 1, 2018 with English translation (15 pages).

English translation of Chinese Office Action issued in counterpart Chinese Application No. 201680004400.7 dated Jan. 9, 2019 (four pages).

German-language Search Report issued in counterpart German Application No. 10 2015 207 906.6 dated Dec. 10, 2015 with partial English translation (12 pages).

International Search Report (PCT/ISA/210) issued in PCT Application No. PCT/EP2016/054966 dated Jun. 6, 2016 with English translation (7 pages).

German-language Written Opinion (PCT/ISA/237) issued in PCT Application No. PCT/EP2016/054966 dated Jun. 6, 2016 (4 pages).

* cited by examiner

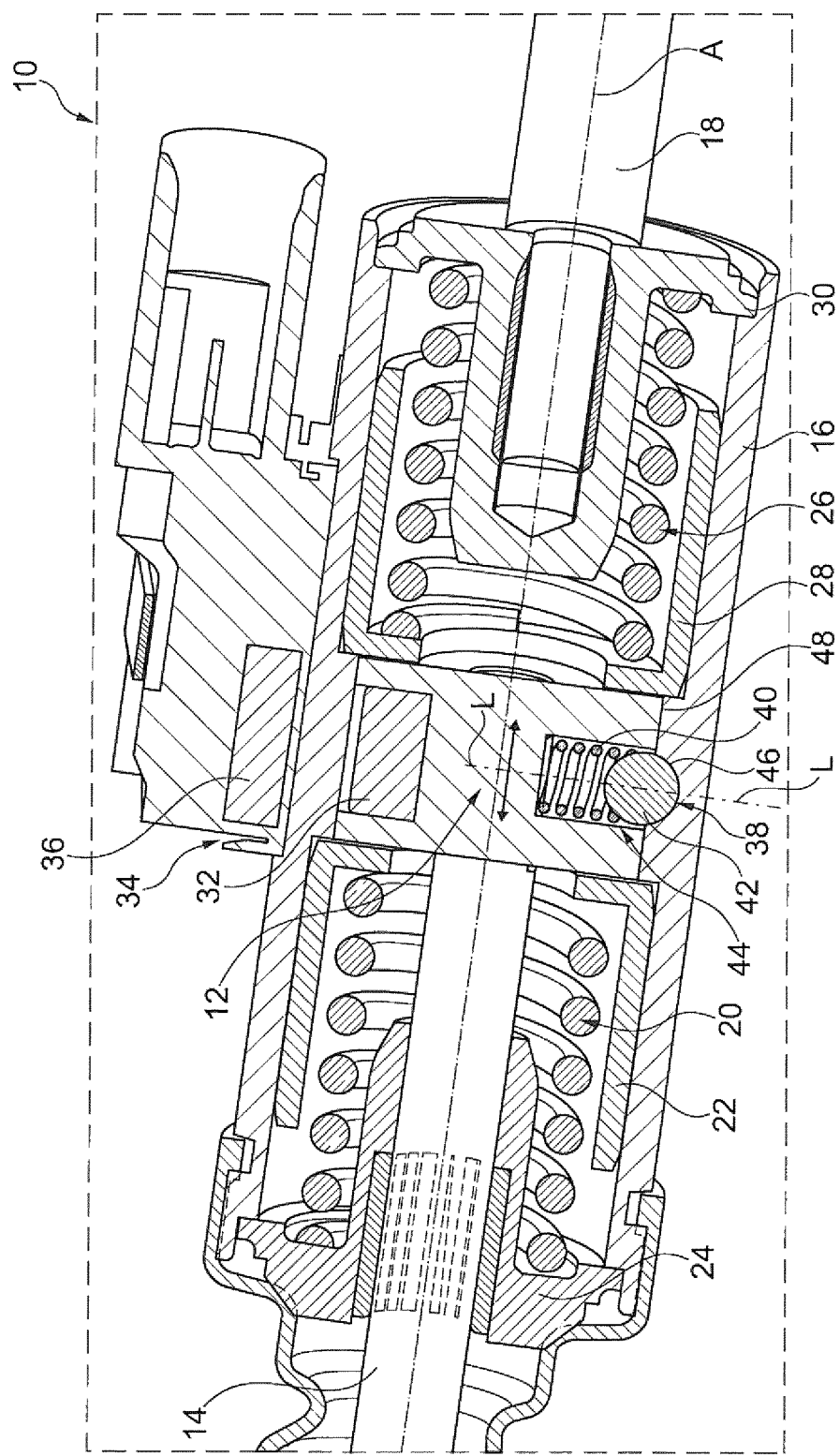

TRANSMISSION SHIFTING ASSISTANCE DEVICE AND SHIFTING DEVICE FOR A MOTORCYCLE

CROSS REFERENCE TO RELATED APPLICATIONS

This application is a continuation of PCT International Application No. PCT/EP2016/054966, filed Mar. 9, 2016, which claims priority under 35 U.S.C. § 119 from German Patent Application No. 10 2015 207 906.6, filed Apr. 29, 2015, the entire disclosures of which are herein expressly incorporated by reference.

BACKGROUND AND SUMMARY OF THE INVENTION

The invention relates to a transmission shifting assistance device, in particular for a motorcycle, having a housing, a piston which is arranged in the housing, and at least one compression spring which is provided in the housing, the piston being displaceable relative to the housing with the compression of at least one compression spring. Furthermore, the invention relates to a shifting device for a motorcycle having a transmission shifting assistance device of this type.

A transmission shifting assistance device of the generic type is known, for example, from DE 10 2010 015 037 A1 and, in particular in the case of very sporty motorcycles, makes rapid shifting without actuation of the clutch possible for the rider. To this end, the device which is also called a shifting assistant is arranged between a foot shifting lever of the shifting device and the transmission input. As is known, the foot shifting lever is pulled upward in order to shift from a current gear into the next higher gear, whereas shifting is carried out sequentially into lower gears by way of pressing of the shifting lever downward. Here, the transmission shifting assistance device which is arranged between the foot shifting lever and the shifting input of the transmission detects the shifting force which is exerted by the foot of the rider. The shifting force is detected by a displacement sensor which detects a relative displacement between the piston and the housing which takes place in the case of corresponding compression of the compression spring. If the displacement travel exceeds a predefined value, the displacement is interpreted by an engine electronics module as a shifting request of the rider. Thereupon, the drive moment of the engine is lowered briefly or the ignition is interrupted, which makes shifting without actuation of the clutch or even without releasing of the throttle possible. Immediately after the shifting operation has taken place, the engine torque is raised again within fractions of a second.

It is to be noted expressly at this point that a transmission shifting assistance device in the context of the invention is not to be understood to mean a synchronization device for a transmission; a transmission shifting assistance device serves merely to detect a shifting request of the rider via a sensor device and to transfer a corresponding electronic signal to an engine controller or to an engine electronics module.

It is disadvantageous in the case of known transmission shifting assistance devices that the compression spring or the compression springs has/have to be of relatively stiff configuration, in order to make precise neutral finding possible. The stiff compression springs cause the transmission shifting assistance device to not respond during the engagement of neutral, i.e., with the objective of moving the shifting assistance device as an entire unit, without a relative movement between the piston and the housing. Therefore, the compression springs in the transmission shifting assistance device have to have a sufficiently high spring hardness that the force for compressing the compression springs out of a neutral position is greater than the force which is necessary in the transmission to engage neutral. As a consequence of this, the force applied by the rider counter to the compression springs during the further compression (as is the case in every shifting operation) rises yet further, although this would not be necessary for the actual shifting operation. Said force level is perceived to be stiff and uncomfortable by many riders.

It is therefore an object of the invention to provide a transmission shifting assistance device and a shifting device for a motorcycle which avoid the stated disadvantages.

To this end, according to the invention, in the case of a transmission shifting assistance device of the type mentioned at the outset, a locking device is provided which is configured separately from the compression spring or the compression springs and fixes the piston in a neutral position relative to the housing below a predefined unlocking force which is exerted on the piston or the housing. The locking device therefore prevents a relative movement between the piston and the housing and therefore a response of the transmission shifting assistance device until the predefined unlocking force is exceeded. Below the predefined unlocking force, the transmission shifting assistance device is therefore moved in its entirety, as a result of which neutral can be engaged. During shifting between gears, the locking device is released when the force from the rider exceeds the predefined force threshold. The shifting assistance device may then be actuated, and the shifting operation carried out. Since, as a consequence, the locking device ensures reliable neutral finding in the case of the transmission shifting assistance device according to the invention, the compression springs or the compression spring in the transmission shifting assistance device can be of considerably softer design for the shifting operation itself. The transmission shifting assistance device according to the invention therefore ensures an increased riding comfort, since considerably lower forces than previously result for the rider when shifting the gears, without it being necessary for precise neutral finding to be dispensed with.

According to one preferred embodiment, two compression springs are provided which are arranged in the housing on both sides of the piston, the piston being arranged, in particular, in its neutral position approximately centrally in the housing in the axial direction. Here, the two compression springs can be configured with different spring characteristics. This configuration may be advantageous in practice, since tests have shown that pulling a foot shifting lever upward is possible in a substantially more sensitive manner than pressing a foot shifting lever downward. It is therefore advantageous if the spring characteristic in the first shifting direction (that is to say, upward) is softer than in the second shifting direction (that is to say, downward).

As an alternative, it is of course also possible to provide only a single compression spring, which results in a particularly low installation space requirement.

One refinement which is particularly reliable and nevertheless simple and therefore inexpensive can be achieved if the locking device has a locking spring and a locking element which is loaded by the locking spring.

The locking spring is preferably a spiral spring which can be produced simply and inexpensively.

The locking element is preferably a ball which, due to its geometry, makes simple release upon corresponding force loading possible.

In one preferred embodiment, the piston has a recess, in which the locking spring and the locking element are arranged, the locking spring attempting to press the locking element out of the recess into a locking recess which is fixed on the housing. This can be realized simply in terms of manufacturing technology.

As an alternative, the locking spring and the locking element can be arranged in a recess in the housing, the locking spring then pressing the locking element into a recess on the piston.

In particular, a longitudinal axis of the recess extends perpendicularly with respect to the displacement direction of the piston. This makes unlocking possible in the case of an identical force in both displacement directions of the piston relative to the housing.

In order to fix the piston securely in the housing below the predefined unlocking force, the locking element protrudes at least partially out of the recess in the neutral position and extends into the locking recess, in order to form a positively locking connection.

A circumferential wall of the housing preferably has the locking recess, into which the locking element engages at least partially in the neutral position.

According to one preferred embodiment, the at least one compression spring and the locking spring and the geometry of the locking element and that of the locking recess are adapted to one another in such a way that the axial displacement force for moving the locking element out of the locking recess is greater than the displacement force which is to be applied subsequently for displacing the piston counter to the at least one compression spring. This ensures precise neutral finding, considerably lower forces than previously resulting for the rider during the shifting of the gears.

In one development of the invention, a first part of a sensor arrangement is provided on the piston, which first part interacts with a second part which is provided on the housing, as a result of which a relative movement between the housing and the piston can be detected. In this embodiment, the sensor arrangement is a contactless magnetic sensor. The sensor arrangement can of course also be arranged at another location, for instance on a piston rod which is connected to the piston.

The transmission shifting assistance device according to the invention is used, in particular, in a shifting device for a motorcycle, having a shifting lever which can be actuated by foot in a first shifting direction or in a second shifting direction which is opposed to the first shifting direction, which shifting lever is coupled to a shifting input of a motorcycle transmission via the transmission shifting assistance device. The transmission shifting assistance device according to the invention makes shifting when the clutch is closed possible. A shifting device of this type ensures increased riding comfort, since considerably lower forces than previously result for the rider during shifting of the gears, without it being necessary for precise neutral finding to be dispensed with.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a sectional view of a transmission shifting assistance device used in a shifting device for a motorcycle in accordance with an embodiment of the present invention.

DETAILED DESCRIPTION OF THE DRAWING

The FIGURE shows a transmission shifting assistance device 10 according to the invention (also called a shifting assistant) for a shifting device for a motorcycle. The transmission shifting assistance device 10 has a piston 12 which is connected to a piston rod 14. The piston 12 is arranged displaceably in a housing 16 which is connected fixedly to a housing rod 18. The FIGURE shows the piston 12 in its neutral position, in which it is arranged approximately centrally in the housing 16 in the axial direction A.

The second end (not shown in the FIGURE) of the piston rod 14 serves for attaching the piston 12 to the transmission of the motorcycle, whereas the second end (likewise not shown) of the housing rod 18 serves for attaching the housing 16 to the foot shifting lever of the motorcycle. As an alternative, it is of course also possible to couple the piston 12 to the shifting lever, and to couple the housing 16 to the transmission input of the motorcycle. The transmission shifting assistance device 10 is therefore arranged as a shifting force transmission device between the shifting lever and the transmission input of the motorcycle.

A first compression spring 20 is arranged in the housing 16 on that side of the piston 12 which faces the piston rod 14, which first compression spring 20 is supported on the left-hand side of the piston 12, in particular on a guide element 22 which is provided there. The other end of the compression spring 20 is supported on a housing cover 24. A second compression spring 26 is arranged in the housing 16 on that side of the piston 12 which faces the housing rod 18, which second compression spring 26 is likewise supported on a guide element 28 which is provided on the piston 12 and on a housing cover 30 on the other side.

A first part 32 of a sensor arrangement 34 is provided on the piston 12, which first part 32 interacts with a second part 36 which is provided on the housing 16 and is connected via a connector cable (not shown) to an engine electronics module. This is, in particular, a contactless magnetic sensor, for instance a Hall sensor.

Furthermore, a locking device 38 is provided which is configured separately from the compression springs 20, 26. The locking device 38 has a locking spring 40 which is configured as a spiral spring and a locking element 42 in the form of a ball, which locking element 42 is loaded by the locking spring 40.

Both the locking spring 40 and the locking element 42 are arranged in a cylindrical recess 44 of the piston 12, the longitudinal axis L of which cylindrical recess 44 extends perpendicularly with respect to the displacement direction of the piston 12 which corresponds to the axial direction A. Here, the locking spring 40 presses the locking element 42 partially out of the recess 44 into an approximately hemispherical locking recess 46 which is configured in a circumferential wall 48 of the housing 16.

In the neutral position which is shown in the FIGURE, the locking element 42 therefore engages at least partially into the locking recess 46 or extends into the latter, in order to form a positively locking connection. As a result, the piston 12 is fixed in the neutral position relative to the housing 16 as long as a predefined unlocking force is not exerted in the axial direction A on the piston 12 or the housing 16, which unlocking force is sufficient to release the locking device 38.

Here, the compression springs 20, 26 and the locking spring 40 and the geometry of the locking element 42 and that of the locking recess 46 in the circumferential wall 48 of the housing 16 are adapted to one another in such a way that the axial displacement force which is necessary for moving the locking element 42 out of the locking recess 46 is greater than the displacement force which is to be applied subsequently for displacing the piston 12 counter to the compression spring 20 and/or 26.

If neutral is then to be engaged in the motorcycle, the rider exerts a force on the foot shifting lever is lower than the predefined unlocking force of the locking device 38, with the result that the shifting assistance device 10 moves in its entirety and neutral is engaged in the transmission.

If, in contrast, the rider wishes to shift into a higher gear, he/she pulls the foot shifting lever upward with a correspondingly greater force (the greater force is necessitated by the currently applied engine moment, which prevents movement of the shifting drum, the transmission shifting lever and ultimately the housing rod 18 until the engine controller reduces the moment). The greater axial displacement force is directed to the left and is exerted via the housing rod 18 on the housing 16 (or the piston 12) and presses the locking element 42 counter to the prestress of the locking spring 40. The locking element 42 then moves out of the locking recess 46 completely into the recess 44 of the piston 12, as a result of which the relative movement between the piston 12 and the housing 16 is first made possible.

During an upshift, the housing 16 of the shifting assistance device 10 is likewise subjected to a compressive load by way of the pressure which is applied via the housing rod 18, which leads to a compression of the compression spring 26. The piston rod 14 is pushed into the housing and drives the piston 12 to the right, which is registered by way of the sensor arrangement 34, which is fixed on the housing, and is transmitted to the engine electronics module. The latter detects an upshift request of the rider and briefly lowers the drive moment of the engine, which then makes an up shift without actuation of the clutch possible. The spring 26 subsequently ensures the displacement into the neutral position again.

In the reverse shifting direction, the shifting assistance device 10 functions in an analogous manner. If the rider wishes to carry out a downshift, he/she presses the foot shifting lever downward out of the neutral position, to be precise once again with a force which is sufficient to release the locking device 38 (by the locking element 42 being moved counter to the locking spring 40 into the recess 44 of the piston 12 to such an extent that the piston 12 is no longer fixed relative to the housing 16). The movement sequences of the other parts can be described as follows.

The rod 14 which moves to the left drives the guide element 22 and the piston 12 to the left, which leads to the compression of the compression spring 20. The compression spring 26 decompresses to the left and presses the piston 12 and the part 32 to the left via the guide element 28.

The relative displacement between the piston 12 and the housing 16 is interpreted by the engine electronics module as a shifting request of the rider for a downshift into a lower gear. The drive moment of the engine is again lowered briefly, and a downshift without actuation of the clutch is thus made possible. The springs 20, 26 subsequently ensure the neutral position again.

Since the compression springs 20, 26 have a considerably lower spring hardness in comparison with the compression springs from shifting assistance devices which are known from the prior art, shifting is considerably more comfortable for the rider in the case of the shifting assistance device 10 according to the invention. There is nevertheless precise neutral finding by way of the locking device 38.

It can be provided in one development that the two compression springs 20, 26 have different spring characteristics.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle transmission shifting assistance device, comprising:
    a housing;
    a piston displaceably arranged in the housing;
    at least one compression spring arranged in the housing such that when compressed at least one of the at least one compression spring presses on the piston, and
    a locking device configured to fix the piston in a neutral position relative to the housing when an axial displacement force exerted on at least one of the piston and the housing is below a predefined unlocking force,
    wherein
        the at least one compression spring includes two compression springs provided in the housing on opposite sides of the piston, and
        the two compression springs have different spring rates.

2. The transmission shifting assistance device as claimed in claim 1, wherein
    the piston is located centrally in the housing when in a neutral position.

3. The transmission shifting assistance device as claimed in claim 2, wherein
    the locking device has a locking element and a locking spring configured to apply a load on the locking spring.

4. The transmission shifting assistance device as claimed in claim 3, wherein
    the locking spring is a spiral spring.

5. The transmission shifting assistance device as claimed in claim 4, wherein
    the locking element is a ball.

6. The transmission shifting assistance device as claimed in claim 5, wherein
    the piston has a piston recess configured to receive the locking spring and the locking element, and
    the locking spring is arranged to bias the locking element out of the piston recess into a housing locking recess when the piston is in the neutral position.

7. The transmission shifting assistance device as claimed in claim 6, wherein
    a longitudinal axis of the piston recess is perpendicular with respect to a displacement direction of the piston.

8. The transmission shifting assistance device as claimed in claim 7, wherein
    when in the neutral position, the locking element extends at least partially out of the piston recess and into the housing locking recess such that a positively locking connection is formed.

9. The transmission shifting assistance device as claimed in claim 8, wherein
    the housing locking recess is located in a circumferential wall of the housing.

10. The transmission shifting assistance device as claimed in claim 9, wherein the at least one compression spring, the locking spring, a geometry of the locking element and a geometry of the housing locking recess are adapted to one another such that the axial displacement force required to move the locking element out of the housing locking recess is greater than the axial displacement force required for displacing the piston counter to the at least one compression spring after the locking element is moved out of the housing locking recess.

11. The transmission shifting assistance device as claimed in claim 1, further comprising:

a sensor arrangement, wherein a first part of the sensor arrangement located at the piston is arranged to interact with a second part of the sensor arrangement located at the housing in a manner that permits sensing of a relative movement between the first part of the sensor arrangement when the piston is axially displaced relative to the housing.

12. A shifting device for a motorcycle, comprising:

a shifting lever configured to be actuated in a first shifting direction and in a second shifting direction opposite the first shifting direction; and a transmission shifting assistance device configured to couple the shifting lever to a shifting input of a motorcycle transmission, the transmission shifting assistance device including a housing;

a piston displaceably arranged in the housing;

at least one compression spring arranged in the housing such that when compressed at least one of the at least one compression spring presses on the piston, and a locking device configured to fix the piston in a neutral position relative to the housing when an axial displacement force exerted on at least one of the piston and the housing is below a predefined unlocking force, wherein the at least one compression spring includes two compression springs provided in the housing on opposite sides of the piston, and the two compression springs have different spring rates.

* * * * *